United States Patent
Creed et al.

[11] Patent Number: 5,485,976
[45] Date of Patent: Jan. 23, 1996

[54] PLASTIC BOTTOM DIAPHRAGM FOR AIRCRAFT SEAT

[75] Inventors: Kevin Creed; Klay Gilbert, both of Lindsay, Tex.

[73] Assignee: Weber Aircraft, Inc., Gainesville, Tex.

[21] Appl. No.: 180,566

[22] Filed: Jan. 12, 1994

[51] Int. Cl.⁶ .......................... B64D 11/06; B64D 25/00
[52] U.S. Cl. .................. 244/118.6; 244/122 R; 297/452.55; 297/217.1; 441/127
[58] Field of Search .......................... 244/122 R, 118.5, 244/118.6; 114/363; 441/126, 127; 297/440.22, 452.55, 193, 217, 217.1

[56] References Cited

U.S. PATENT DOCUMENTS

| | | | |
|---|---|---|---|
| 2,459,843 | 1/1949 | Scholander | 297/217 |
| 3,006,688 | 10/1961 | Ouellette | 297/452.15 |
| 3,054,643 | 9/1962 | Militano | 297/440.2 |
| 3,144,271 | 8/1964 | Lieberman et al. | 297/248 |
| 3,154,345 | 10/1964 | Lambrecht | 441/126 |
| 3,253,860 | 5/1966 | Shapiro | 297/440.24 |
| 3,516,098 | 6/1970 | O'Link | 441/127 |
| 3,642,322 | 2/1972 | Bilancia | 297/440.22 |
| 3,873,155 | 3/1975 | Barecki | 297/445 |
| 3,903,554 | 9/1975 | Dodd | 441/126 |
| 3,907,363 | 9/1975 | Baker et al. | 297/452.55 |
| 3,942,836 | 3/1976 | Baker | 297/445 |
| 4,277,103 | 7/1981 | Weik | 297/452.21 |
| 4,306,748 | 12/1981 | Sullivan | 441/127 |
| 4,630,864 | 12/1986 | Toll | 297/232 |
| 4,834,451 | 5/1989 | Meunier et al. | 297/452.55 |

FOREIGN PATENT DOCUMENTS

685074  4/1964  Canada ............................ 297/440.22

*Primary Examiner*—William Grant
*Attorney, Agent, or Firm*—Crutsinger & Booth

[57] ABSTRACT

An improved aircraft seat having a base frame including leg assemblies for supporting front and rear horizontal stretcher tubes and spreaders. A bottom diaphragm supporting a bottom seat cushion of an individual passenger seat is positioned between two of the spreaders and is removably connected to the front and rear stretcher tubes. The bottom diaphragm is preferably a formed tray-like member of unitary construction forming an open receptacle for a floatation portion on the bottom seat cushion.

22 Claims, 5 Drawing Sheets

PLASTIC BOTTOM DIAPHRAGM FOR AIRCRAFT SEAT

FIELD OF THE INVENTION

The present invention relates to an improved aircraft seat. More particularly, the present invention relates to a removable bottom diaphragm for the base frame of an aircraft seat.

BACKGROUND OF THE INVENTION

The design of passenger seats for aircraft requires consideration of passenger comfort, the number of seats and space limitations in a particular aircraft, and the location of the seat in the aircraft. Passenger seats generally include an aluminum base frame assembly to which are attached reclining seat backs, center arm rest assemblies, fold-down food table assemblies, and fully upholstered seat back and bottom cushion assemblies.

In the past, the bottom cushion assembly of the individual passenger seat was supported by a conventional bottom diaphragm formed of an aluminum sheet that was riveted along its edges to the tops of the stretcher tubes between two of the spreaders. The riveted aluminum sheets were difficult and time consuming to remove and replace. Other bottom diaphragms have been constructed of fabric or webbing which tends to wear out and fray.

U.S. Pat. No. 4,277,103 discloses a continuous sheet of aluminum shaped to establish a natural seat bottom depression to prevent pelvic rotation.

U.S. Pat. No. 4,630,864 issued Dec. 23, 1986 to Ian C. Toll discloses a seat diaphragm stiffened with a panel of structural foam and skinned with carbon fiber material.

Seat cushions for aircraft seats are generally made of soft, open-cell, low density comfort foam, such as polyurethane. If floatation assistance is not required, the cushion may be constructed entirely of this type of open-cell foam.

If a bottom seat cushion is to provide a passenger with floatation assistance for emergency ditching, a portion of the comfort foam is generally replaced with a hard, closed-cell higher density floatation foam. Heretofore, replacing the comfort foam with floatation foam, made the cushions harder and less comfortable. Thus, it has often been the goal, when designing bottom cushions, to use only enough floatation foam to meet regulatory requirements. This has usually meant that the cushion contained multiple small pieces of floatation foam, placed around the underside of the cushion, in an effort to maximize the comfort foam.

Often seat design becomes a compromise of comfort versus floatation versus safety when placing the floatation foam in the cushion. The floatation foam has the ability to dissipate energy better than comfort foam when placed in the cushion to reduce the spinal impact energy that a passenger receives during a crash.

Business class and first class seats can be provided with a console with personal storage compartments, compartments for cocktail trays, and the like. A first class sleeper seat may include additional features such as a video monitor, an extendable leg rest, and other features for passenger comfort and convenience.

Economy or coach passenger seats are generally narrower and more densely spaced than business class or first class seats. Further, the seats of commuter aircraft are generally closer spaced and more dense than seats for larger widebody international flights.

The spacing of spreaders and legs along the length of the stretcher tubes will vary for different types of seats and different seating arrangements. The position of legs on seats nearest the aisle and seats nearest the wall of the aircraft may vary depending upon the structural design of the aircraft, the number of seats in the row and the location of the row of seats in the aircraft. The connections between spreaders and stretcher tubes and between leg assemblies and stretcher tubes often vary depending upon the location of the spreaders on the stretcher tubes, the location of the legs on the stretcher tubes, and whether the seat is a front facing seat or a rear facing seat.

Heretofore, the construction and maintenance of aircraft seats has been very expensive because operations have been labor intensive. Furthermore, the size and shape of components of the seat vary depending upon the location of the installation in the aircraft, resulting in a multitude of parts that must be kept in inventory for proper maintenance. Periodic maintenance required on aircraft seats generally requires replacement or disassembly of the entire seat merely for replacing or installing a component in the seat assembly.

The important structural requirements for safety must be met and at the same time the airline operator needs to be able to easily and cost effectively maintain the seats. It is often necessary to change the seating configuration in the aircraft to meet different passenger and market needs. In the past, the assembly and disassembly of the seats has been a complicated, time consuming, and expensive process, often requiring that most of the seat support structure be disassembled in order to move or change the seating configuration. Furthermore, every reduction in the weight of the seats without reducing the structural integrity saves the airline fuel and reduces operating expenses.

SUMMARY OF THE INVENTION

A typical aircraft seat base frame supports the individual passenger seats. In general, the base frame has a plurality of leg assemblies for supporting a front horizontal stretcher member and a rear horizontal stretcher member. The front and rear stretcher members are typically tubular, having a circular cross-section with concentric inner and outer walls. However, the stretcher members can have other cross-sections. A plurality of base frame spreaders maintain the front and rear horizontal stretcher members in parallel, spaced-apart relationship. Normally the back of a passenger seat is pivotally mounted between two of the spreaders, and a passenger arm rest is mounted to each spreader.

According to one aspect of the present invention, a bottom diaphragm for supporting the bottom seat cushion of an individual passenger seat is positioned between two of the spreaders and removably connected to the front and rear horizontal stretcher members. The diaphragm is preferably integrally formed of a composite or plastic material and has generally horizontally extending sleeve portions formed on the front and back thereof for removably mounting the diaphragm to the front and rear horizontal stretcher members. The sleeve portions are generally channel shaped for fitting over a portion of the stretcher members.

The diaphragm is adapted to be installed by "snapping" or "popping" lobes on the sleeves between the front and rear stretcher members. The material of the diaphragm is deformed during installation as it is pushed between the stretcher members, but it returns back to the original relaxed condition to "lock" between the stretcher members.

According to another aspect of the invention adapted for tubular stretcher members, the sleeves can be formed to have an open, semi-cylindrical structure adapted to extend around more than one-half the circumference of the stretcher tubes. Thus, the plastic material of the sleeves is deformed during installation as it is pushed over-center of the stretcher tube, but it returns back to the original relaxed condition to "lock" onto the tubular member by encircling more than one-half the circumference of the stretcher tube.

The seat cushion assembly includes a floatation portion constructed of buoyant material having a density less than the density of water. The floatation portion of the bottom cushion assembly is preferably configured to fit into a receptacle in the seat bottom diaphragm. To reduce the spinal impact energy that a passenger receives during a crash, a block of hard, closed-cell floatation foam is positioned below a thick layer of comfort foam to provide passenger comfort while positioning the floatation foam below the spinal area of the passenger for dissipating spinal impact energy encountered by the passenger during a crash. Providing a bottom diaphragm with a recess into which the floatation foam extends permits the use of a bottom seat cushion providing an optimum combination of passenger comfort, floatation and safety.

Accordingly, it is an object of the present invention to provide an improved aircraft seat support structure in which the bottom diaphragm for the passenger seats can be quickly and easily mounted or removed from the rest of the support structure. It is another object of the invention to provide an improved aircraft seat support structure with a reduced number of parts. It is an object of the invention to provide a seat support structure that is easy and cost effective to maintain. It is another object of the invention to provide an aircraft seat support structure that is capable of meeting the normal safety requirements while being lighter in weight. These and other objects, aspects, and advantages of the present invention will be apparent to those skilled in the art upon reading the following detailed description of preferred embodiments.

BRIEF DESCRIPTION OF THE DRAWINGS

The accompanying drawings are incorporated into and form a part of the specification to illustrate several examples of the present invention. These drawings and the detailed description of the preferred embodiments serve to explain the principles of the invention. The drawings are only for the purposes of illustrating the presently preferred examples of how the invention can be made and used, and the drawings are not to be construed as limiting the invention to only the illustrated embodiment of the invention. The various advantages and features of the present invention will be apparent from a consideration of the drawings, in which.

Numeral references are employed to designate like parts throughout the various figures of the drawings.

DETAILED DESCRIPTION OF THE PREFERRED EMBODIMENTS

Figure 1:
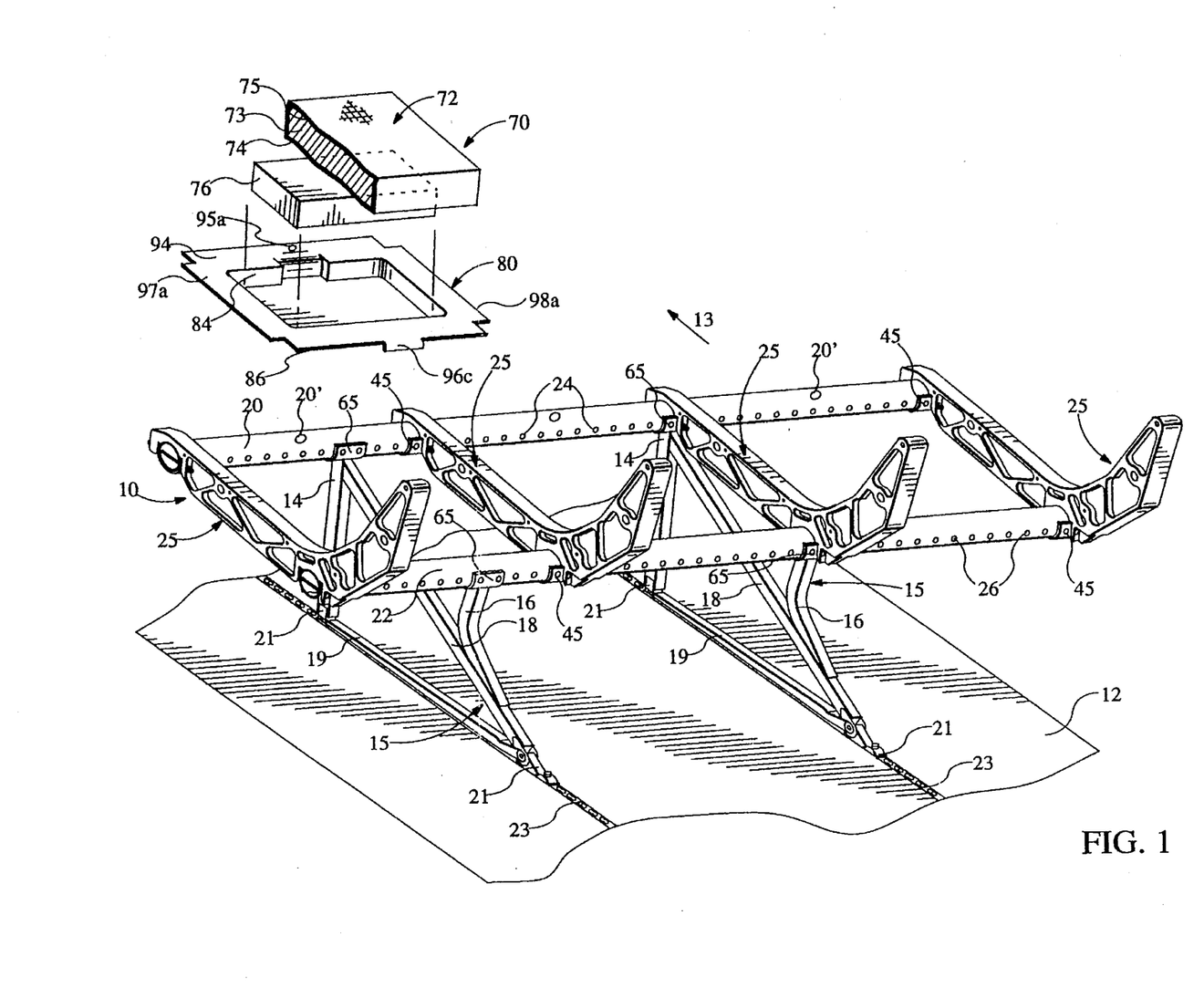
FIG. 1 is an exploded fragmentary perspective view of an aircraft seat support structure, the bottom diaphragm and the seat cushion assembly being illustrated in exploded positions for clarity.

Referring to FIG. 1 of the drawing, the numeral 10 generally designates a base frame assembly formed by a pair of stretcher tubes 20 and 22, joined by a plurality of removable spreader members 259 and a plurality of removable leg assemblies 15. As will be hereinafter described in detail, the bottom seat cushion assembly 70 of an individual passenger seat is supported by a seat bottom diaphragm 80 or 100. A first embodiment of the bottom diaphragm is generally designated by the numeral 80 in FIGS. 1–8 of the drawings and a second embodiment is generally designated by the numeral 100 in FIG. 9. The bottom diaphragm 80 or 100 is positioned between two of the spreaders 25 for supporting the bottom seat cushion assembly 70.

Figure 2:
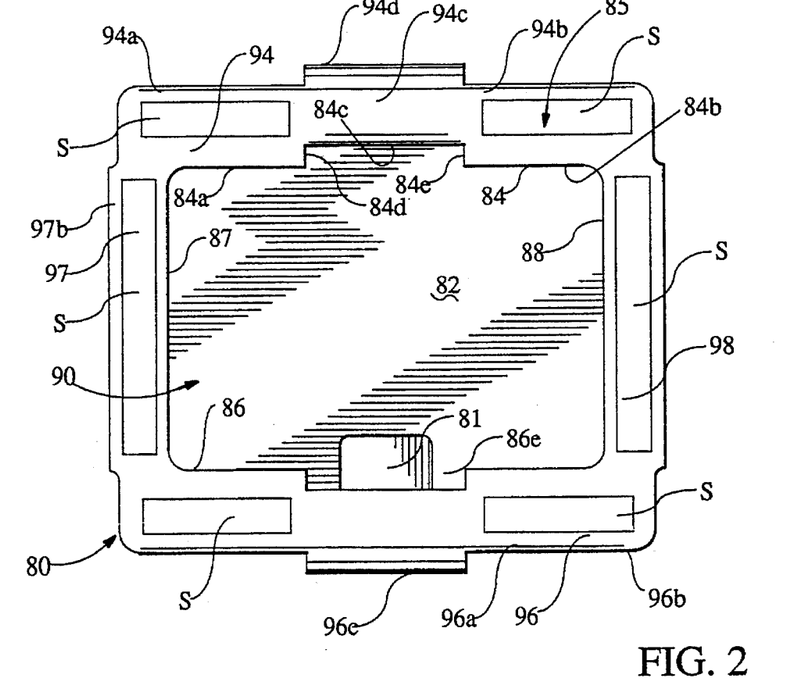
FIG. 2 is a top plan view of the first embodiment of the diaphragm shown in FIG. 1.
Figure 3:
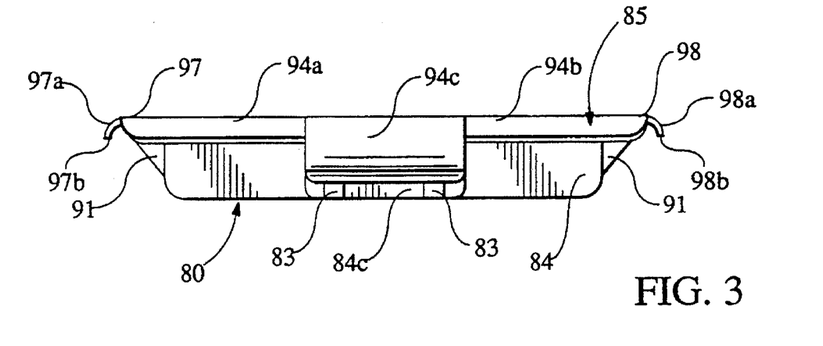
FIG. 3 is a front elevational view thereof.
Figure 4:
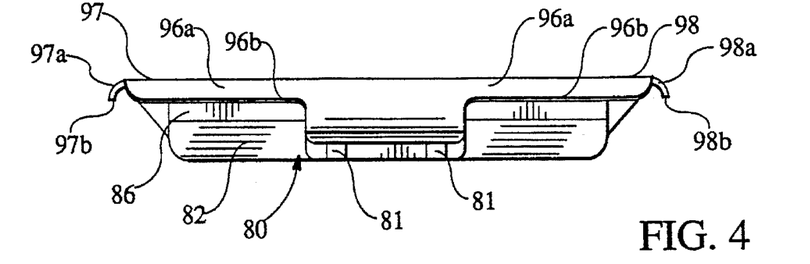
FIG. 4 is a rear elevational view thereof.

Referring to FIGS. 1 and 2, the bottom diaphragm includes a diaphragm body portion, for spanning space between the front and rear stretcher members 20 and 22, and front and rear gripper portions 94c and 96c detachably securing the body portion to the stretcher members. The gripper portions are configured so that they can accommodate possible leg assemblies positioned between the spreader members.

Each bottom diaphragm 80 and 100 is a critical element in the load path which must meet specified design criteria. Generally, the bottom diaphragm must be capable of supporting a downwardly directed load of approximately 1,500 pounds to meet minimum performance standards. This assures that the diaphragm will not fail if subjected to a force of 170 pounds (the assumed weight of a seated passenger) multiplied by 8.6 times the force of gravity.

Further, during crash testing, baggage under the seat tends to move upwardly. To accommodate baggage under the seat, each diaphragm 80 and 100 must be capable of carrying an uplift force of approximately 108 pounds (20 pounds times 5.4 G) to meet minimum performance standards.

Thus, the molded bottom diaphragms 80 and 100 are preferably configured to support and distribute a downwardly directed force of at least 1,500 pounds over stretcher tubes 20 and 22. Further, while being releasibly secured to stretcher tubes 20 and 22, each diaphragm preferably carries an upwardly directed force of at least 108 pounds without disengaging stretcher tubes 20 and 22.

The base frame 10 secures and supports one or more individual passenger seats (not shown) above the floor 12 of the aircraft cabin. As used herein for the purposes of description, the terms "front" and "rear" are with reference to the facing direction of the aircraft seat. It should be appreciated, however, that rows of seats are often mounted back-to-back and that the front of a seat may face the rear of the aircraft.

While a preferred embodiment of the base frame 10 is illustrated in the drawings, it should be appreciated that the diaphragm 80 or 100 and seat cushion assembly 70 can be used in combination with other base frame structures such as those disclosed in Howell et al. U.S. Pat. No. 4,229,040; Amthor et al. U.S. Pat. No. 5,069,505 and Beroth U.S. Pat. No. 5,224,755, the disclosures of which are incorporated herein by reference.

The base frame 10 has a plurality of leg assemblies 15 comprising a front leg structure that typically includes front leg 14, and a rear leg structure that typically includes rear leg 16. The front legs 14 and the rear legs 16 are connected and reinforced by angled struts 18 and bottom horizontal struts 19. Leg assemblies 15 are preferably of identical construction and need not be right or left handed. Further, leg assemblies 15 preferably have energy absorbing characteristics wherein through plastic deformation energy will be dissipated. The deformations are limited through the incorporation of stops to prevent deformation of the leg assembly beyond predetermined limits.

The front legs 14 support a front horizontal stretcher tube 20 above the cabin floor 12. Similarly, rear legs 16 support a rear horizontal stretcher tube 22 above the cabin floor 12. The front horizontal stretcher tube 20 and the rear horizontal stretcher tube 22 are supported in parallel, spaced-apart relationship to one another. Normally the front stretcher tube 20 is positioned about 1.5 inches higher than the rear stretcher tube 22. Furthermore, the horizontal stretcher tubes 20 and 22 are oriented to be perpendicular to the facing direction of the aircraft seat, shown by arrow 13. The front legs 14 and rear legs 16 of the base frame 10 are releasable secured by track fittings 21, for example of the type disclosed in U.S. Pat. No. 5,058,829 to Paul R. Bentley, to tracks 23 laid in the aircraft cabin floor 12.

In the illustrated embodiment, stretcher tubes 20 and 22 are of substantially identical construction and have concentric inner and outer walls and a circular cross-section. For the purposes of description, the circular cross-section of the stretcher tubes can be divided into top, bottom, and side quadrants. However, it should be appreciated that the stretcher members need not be identical and can be constructed with cross-sections of other shapes, such as elliptical, square, or rectangular. Stretcher tubes 20 and 22 are supported in leg stirrups 65 on leg assemblies 15. However, other methods of attachment known to those skilled in the art can be used.

Spreaders 25 are mounted to the front and rear stretcher tubes 20 and 22 and provide additional structural support to maintain the stretcher tubes in parallel, spaced-apart relationship. Normally the back (not shown) of a passenger seat is pivotally mounted between two of the spreaders, and a passenger arm rest (not shown) is mounted to each spreader. The spacing of the spreaders 25 along the stretcher tubes 20 and 22 is adjusted to accommodate the width of a first class, business class, or coach seat.

Spreaders 25 can be connected to stretcher tubes 20 and 22 according to methods well known in the art. However, in the preferred embodiment of the invention spreaders 25 are removably connected to stretcher tubes 20 and 22 to facilitate maintenance of the aircraft seats and changing the configuration of the aircraft seats.

According to the best mode presently contemplated, base frame spreaders 25 are formed of a single piece of machine aluminum configured to facilitate removal of the spreader from stretcher tubes 20 and 22 without disassembly of the complete base frame 10. Spreaders 25 are preferably of substantially identical construction. Each spreader 25 has a downwardly facing saddle 30 adjacent the front end thereof and a downwardly facing saddle 50 adjacent the rear end thereof, saddles 30 and 50 resting on the upper quadrants of the stretcher tubes 20 and 22. The saddles 30 and 50 have recesses formed thereon to engage and receive the upwardly extending side walls of spreader stirrups 45 or leg stirrups 65. However, other methods of attachment known to those skilled in the art can be used.

Stirrups 45 and 65 engage at least the bottom quadrant of the stretcher tubes 20 and 22 and preferably encircle at least 180° of the circumference of stretcher tubes 20 and 22.

The front stretcher tube 20 preferably has a plurality of spaced-apart apertures 24 arranged in two diametrically opposed rows in the side quadrants of the tube 20. Each of the apertures 24 is formed to provide a passage through the front horizontal stretcher tube 20 to allow the passage of any suitable connector such as a screw, bolt, pull pin or the like through the body of the stretcher tube 20. The plurality of apertures 24 are aligned in parallel and in closely spaced-apart intervals, for example spaced on 1.5 inch centers, along the length of the stretcher tube 20. When connected to the front legs 14, the front horizontal stretcher tube 20 is preferably oriented such that the apertures 24 are oriented in a substantially horizontal plane. Similarly, the rear horizontal stretcher tube 22 preferably has a plurality of apertures 26 arranged in two diametrically opposed rows in the side quadrants of the tube 22. Each of the apertures 26 is formed to provide a passage through the rear horizontal stretcher tube 22 to allow the passage of a screw, bolt, pull pin or other suitable connector through the body of the stretcher tube 22. The plurality of apertures 26 are aligned in parallel and in closely spaced-apart intervals along the length of the stretcher tube 22. When connected to the rear legs 16, the rear horizontal stretcher tube 22 is preferably oriented such that the apertures 26 are oriented in a substantially horizontal plane and front to rear.

If a spreader 25 is positioned vertically above a leg assembly 15, then the saddles 30 and 50 engage the upwardly extending side walls of leg stirrups 65 that support the stretcher tubes. Leg stirrups 65 support the horizontal stretcher tubes 20 and 22. Leg stirrups 65 are preferably integrally formed or welded onto front legs 14 and rear legs 16 of leg assemblies 15.

As illustrated in FIG. 1, in the preferred embodiment of the invention spreader stirrups 45 and leg stirrups 65 can be wider than saddles 30 and 50 on spreaders 25.

Further, saddles 30 and 50 on spreaders 25 are configured such that spreaders 25 and leg stirrups 65 do not interfere with one another, which significantly reduces the number of design variations for mounting legs at different locations on stretcher tubes 20 and 22. Saddles 30 and 50 and stirrups 45 and 65 are configured to carry and distribute force along stretcher tubes 20 and 22 to carry tension or compressive loading so that a single spreader design can be employed in a front or rear facing seat. Further, saddles 30 and 50 and saddle stirrups 45 and leg stirrups 65 are configured to increase the stiffness of stretcher tubes 20 and 22 by distributing force over a significant length of stretcher tubes 20 and 22.

Continuing to refer to FIG. 1, the bottom diaphragm 80 is removably connected to stretcher tubes 20 and 22 between two spreaders 25 for supporting the bottom seat cushion assembly 70 of an individual passenger seat. The seat cushion assembly 70 preferably includes a flotation cushion portion as will hereinafter be described in more detail Furthermore, the diaphragm 80 can also have a passenger life vest or other device releasibly attached to the bottom thereof.

As best shown in FIG. 2, the bottom seat cushion assembly 70 is preferably secured to the diaphragm by strips "S" of loop and hook material, commercially available under the registered trademark "Velcro".

The cushion assembly 7!) includes a foam center portion 73 constructed of soft, open-cell, low density comfort foam, such as polyurethane, covered by fire-blocking material 74 enclosed in a dress cover 75. The seat cushion 70 further includes a floatation portion 76 constructed of a harder, closed-cell buoyant material, such as polyethylene, commercially available from the Dow Chemical Company under the Registered Trademark "ETHAFOAM".

The closed-cell floatation foam portion 76 is preferably positioned at a location under the comfort foam portion 73 below the spinal column of a passenger occupying the seat. The soft, open-cell comfort foam 73 provides passenger comfort while the closed-cell floatation portion 76 provides superior dissipation of spinal impact energy that a passenger receives during a crash. As will be hereinafter more fully explained, floatation portion 76 of bottom cushion assembly 70 is preferably configured to fit into a receptacle in a seat bottom diaphragm.

Figure 7:
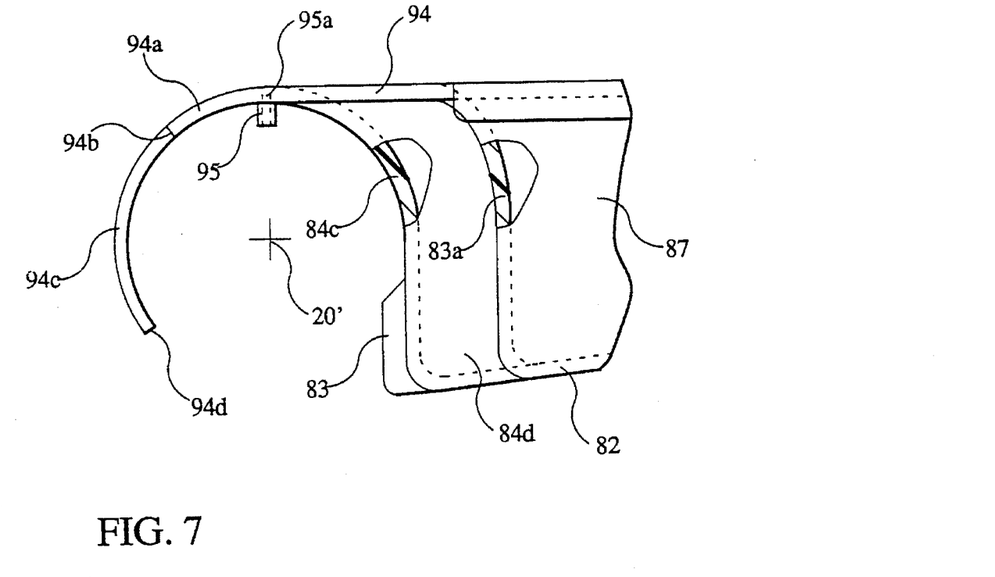
FIG. 7 is an enlarged fragmentary view of the front gripper portion of the bottom diaphragm.
Figure 8:
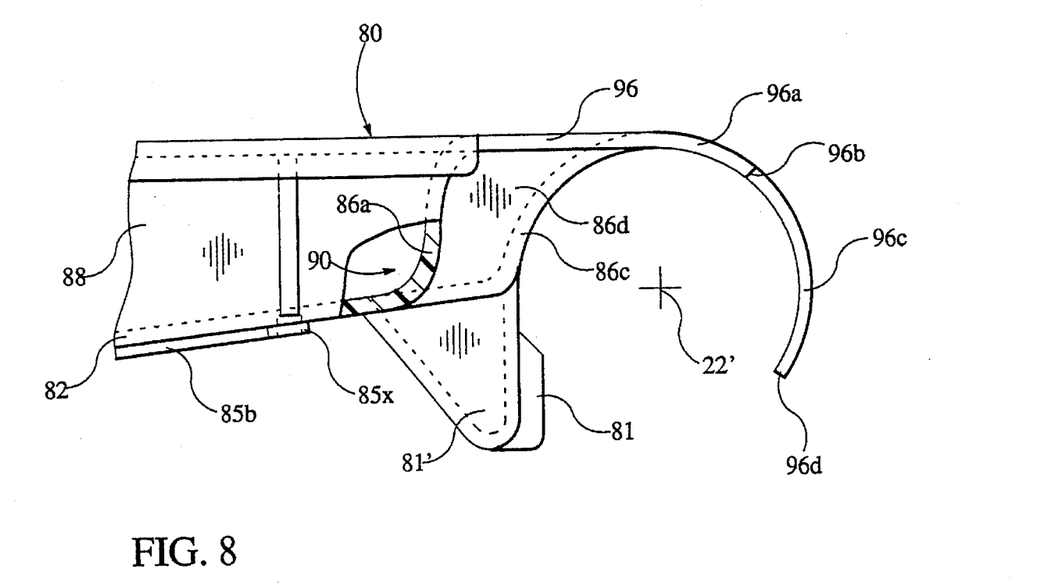
FIG. 8 is an enlarged fragmentary view of the rear gripper portion of the bottom diaphragm; and 9 is a perspective view of an upside down bottom diaphragm according to one aspect of the second embodiment of the invention, which shows the mounting sleeves formed thereon.
Figure 9:
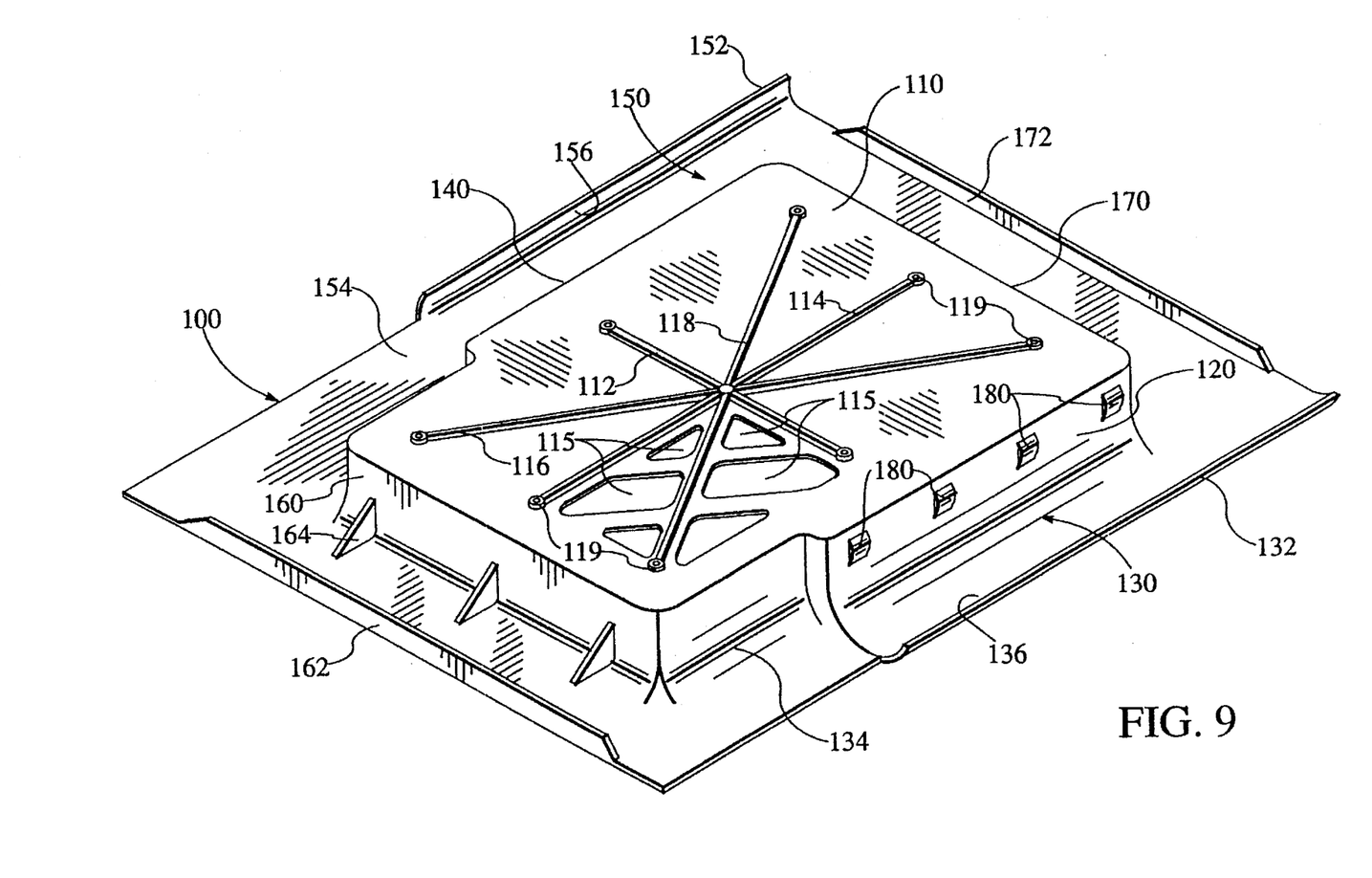

A first embodiment of the seat bottom diaphragm is generally designated by the numeral 80 in FIGS. 1–8 of the drawings. A second embodiment of the bottom diaphragm is illustrated in FIG. 9 of the drawing and designated by the reference numeral 100.

Referring to FIG. 2, the bottom diaphragm 80 is preferably a tray-like member of unitary construction forming an open receptacle 90 with a generally flat bottom wall 82. Bottom wall 82 is bounded by a front wall 84, rear wall 86 and side walls 87 and 88. Floatation portion 76 of bottom cushion assembly 70 is preferably configured to fit into receptacle 90 of the diaphragm.

Figures 5, 6:
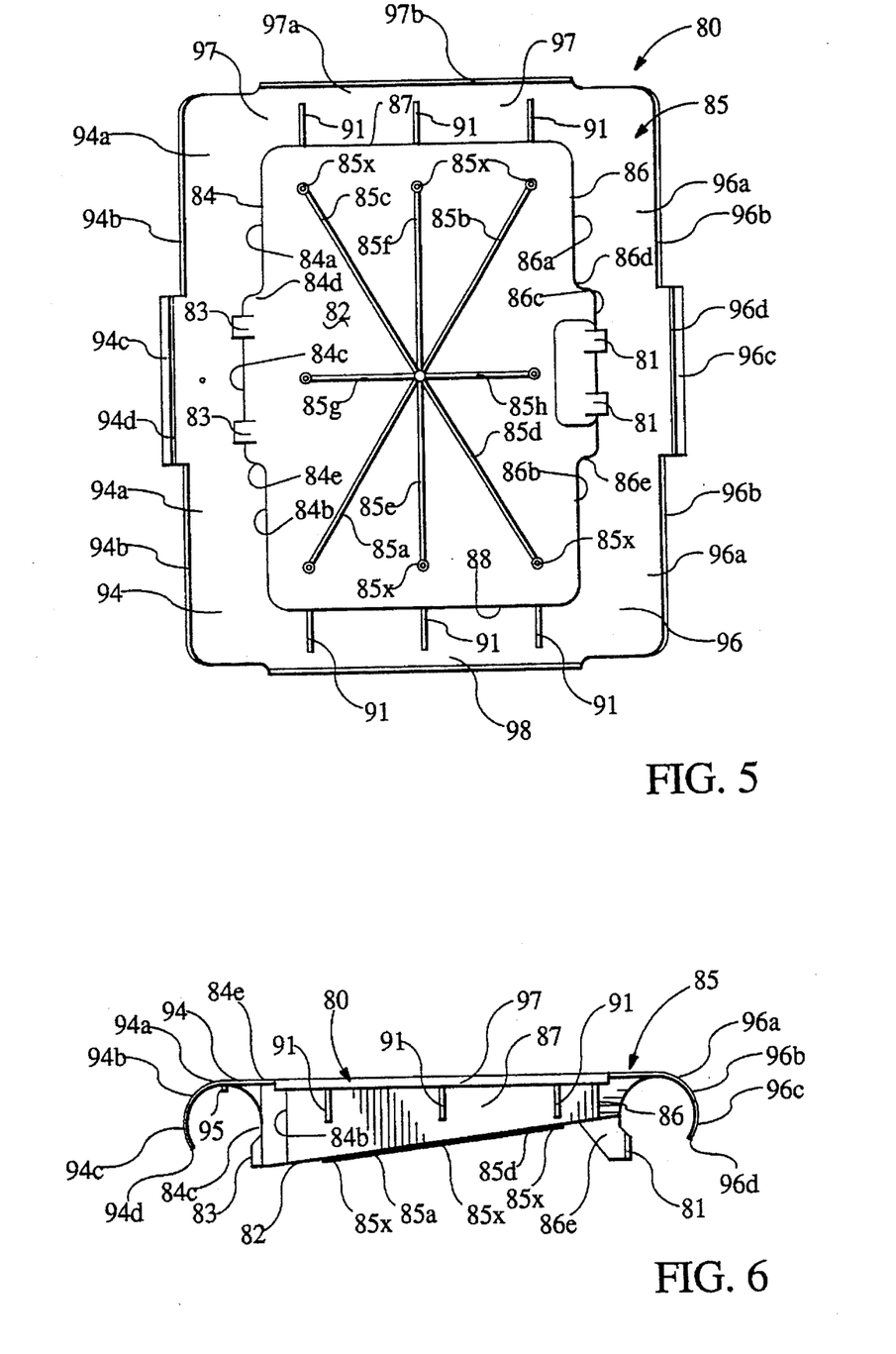
FIG. 5 is a bottom plan view of the first embodiment of the diaphragm shown in FIG. 1.
FIG. 6 is a side elevational view, the other side being a mirror image thereof.

Since the rear stretcher tube 22 on the base frame 10 is generally about one and one half inch lower than the front stretcher tube 20, to maintain bottom wall 82 in a generally horizontal configuration when the bottom diaphragm 80 is positioned between stretcher tubes 20 and 22, the front wall 84 of the bottom diaphragm 80 is preferably about one and one half inch higher than the rear wall 86, as best illustrated in FIG. 6 of the drawing.

Bottom diaphragm 80 preferably has a rim, generally designated by the numeral 85, extending around the upper edges of front wall 84, rear wall 86 and side walls 87 and 88. The rim 85 is formed by a front flange 94 extending generally along the upper edge of front wall 84, a rear flange 96 extending generally along the upper edge of rear wall 86 and side flanges 97 and 98 extending generally along the upper edge of side walls 87 and 88. In the embodiment illustrated in FIG. 6, side flanges 97 and 98 lie in a common plane which is not parallel to the plane of bottom wall 82. Gussets 91 are spaced along side walls 87 and 88 and side flanges 97 and 98 to reinforce and stiffen the side flanges and side walls. Side flanges 97 and 98 close out the space left between the main body of the diaphragm 80 and the spreaders 25, which reduces the possibility of catching on passenger appendages or clothing during an emergency egress when the flotation cushion 70 is removed.

The seat cushion assembly 72, best illustrated in FIG. 1, includes a floatation portion 76 constructed of buoyant material having a density less than the density of water. The floatation portion 76 of the bottom cushion assembly is preferably configured to fit into receptacle 90 in the seat bottom diaphragm 80. The center of comfort foam portion 73 is preferably positioned above and supported by the floatation portion 76, while the outer periphery of the comfort foam portion rests on the upper surfaces of flanges 94, 96, 97 and 98. This construction permits the use of more comfort foam in portion 73 of the seat than is typically used in a floatation seat cushion while using a substantial quantity of closed-cell energy absorbing floatation material positioned below the spinal column of a passenger which reduces passenger spinal loads during crash testing.

Referring to FIGS. 2 and 5 of the drawing, the central portion 84c of front wall 84 is spaced outwardly from end portions 84a and 84b and transition portions 84d and 84e connect opposite ends of central portion 84c to end portions 84a and 84b, respectively.

Flange 97, extending along the upper edge of side wall 87, has a rolled portion 97a adjacent the outer edge 97b. Side flange 98 has a rolled portion 98a adjacent the outer edge 98b.

As best illustrated in FIGS. 2, 6 and 7 of the drawing, the central portion 94c of front flange 94 is substantially semi-cylindrical in configuration. It has an inner edge connecting with the central portion 84c of front wall 84 and has a free outer edge 94d which projects beyond edges 94b of curved portions 94a on each of the end portions of front flange 94. The rear flange 96 is similarly constructed and has a semi-cylindrical central portion 96c having an outer edge 96d.

A pair of lobes 83 project outwardly from the central portion 84c of front wall 84 and a pair of lobes 81 project outwardly from the central portion 86c of rear wall 86. As best illustrated in FIG. 8, the lobes 81, projecting from rear wall 86, are formed on a hollow projection 81' formed in bottom wall 82 for positioning lobe 81 below the axis 22' of stretcher tube 22.

Central portions 94c and 96e of front and rear flanges 94 and 96 are configured to resiliently grip stretcher tubes 20 and 22 when the bottom diaphragm 80 is positioned between stretcher tubes 20 and 22. Lobes 83 on the central section 84c of front wall 84 and the outer edge 94d of the semi-cylindrical central portion 94c of front flange 94, in a relaxed condition, are spaced apart a distance less than the diameter of stretcher tube 20. Similarly, lobes 81 on the central portion 86c of rear wall 86 and edge 96d on the central portion 96c of rear flange 96 are spaced apart a distance less than the diameter of rear stretcher tube 22, when in a relaxed condition. However, the central portions 94c and 96c of front flange 94 and rear flange 96 are preferably constructed of a semi-rigid material which is sufficiently resilient to allow edges 94d and 96d to spring outwardly when bottom diaphragm 80 is urged downwardly into engagement with stretcher tubes 20 and 22. After edges 94d and 96d move past the largest portion of the diameter of stretcher tubes 20 and 22, edges 94d and 96d spring inwardly such that the upper portion of stretcher tubes 20 and 22 are captured and encircled by the semi-cylindrical portions 94c and 96c of central portions of flanges 94 and 96.

It should be readily apparent that rim 85 around the receptacle 90 supporting downwardly directed loads applied to the diaphragm 80, may assume other and further shapes and configurations. For example, if it is deemed expedient to do so, the rim 85 may be substantially flat or slightly curved and portions may be cut away to provide clearance of components of the seat.

Stretcher tube 20 preferably has holes 20' positioned midway between spreaders 25. Preferably, a hollow locator pin 95, having a hole 95a extending therethrough, projects downwardly from the middle of central portion 94c of the front flange 94. The locator pin 95 extends into hole 20' when bottom diaphragm is properly positioned between spreaders 25. The hole 95a in pin 95 facilitates positioning pin 95 in hold 20' because it can be used as a sight.

Bottom diaphragm 80 is preferably formed of an injection molded plastic material formed of, for example, polycarbonate material such as Lexan resin, which is commercially available from General Electric Plastics. The material has a tensile strength of about 10,500 psi with elongation of sixty percent, the Rockwell hardness is M70, and the deformation temperature under load is 293° F.

Lexan 145, of General Electric, is polycarbonate powder for use in emulsion coatings which have high strength and toughness, and are non-toxic. When this type of resin is compounded with glass fiber, its tensile strength is increased. Polycarbonate material is generally considered to be one of the toughest of all plastics. If it is deemed expedient to do so, bottom diaphragm 80 may be processed of polycarbonate or other suitable plastics by injection molding, blow-molding, rotational molding or by vacuum forming.

An array of ribs 85a, 85b, 85c, 85d, 85e, 85f, 85g, 85 and 86f is formed on the bottom wall 82 to provide a lightweight structure. Bosses 85x are formed adjacent ends of the ribs and are provided with holes to receive fasteners for mounting a life vest pouch or other device (not shown) under the bottom diaphragm.

The semi-cylindrical central portion 94c of front flange 94, has a generally channel-shaped configuration for gripping stretcher tube 20. The side walls and channel-shaped structures contribute structural strength to the bottom diaphragm 80 for supporting the weight of a seated passenger while minimizing the weight of the diaphragm.

SECOND EMBODIMENT

A second preferred embodiment of a bottom diaphragm 100 is illustrated in FIG. 9 of the drawing in an upside down position for better illustrating its structure. The diaphragm 100 is preferably integrally formed of plastic by typical injection molding processes to have a unitary body.

It is used to support a seat cushion assembly 70 in a passenger seat. As described herein before, the seat cushion assembly has a floatation portion 76 formed of buoyant material and a comfort portion 72 formed of comfort foam or other material. The bottom diaphragm 100 extends between said stretcher members 20 and 22 and has an open receptacle for receiving the floatation portion of 76 of the cushion assembly 70.

In general, the diaphragm 100 preferably has a generally rectangular shape having a bottom wall 110 for supporting the cushion assembly 70. Openings 115 may be provided in bottom wall 110 to reduce the weight of the bottom diaphragm 110. The bottom wall 110 is bordered on one side by a front wall 120 having a generally open sleeve 130 formed thereon and on an opposite side by a rear wall 140 having a generally open sleeve 150 formed thereon. The sleeve portions 130 and 150 form parts of a rim for supporting downwardly directed loads.

The bottom wall 110 preferably has a plurality of ribs 112, 114, 116 and 118 formed on the underside thereof for reinforcing the bottom wall 110. Bosses 119 have holes to receive screws to secure a life vest pouch to the diaphragm.

The bottom wall 110 also has side walls 160 and 170 that define a receptacle for more securely positioning the bottom cushion assembly 70. Side wall 160 has a channel-shaped structure 162 formed thereon and side wall 170 has a similar channel-shaped structure 172. The channel-shaped structure 162 is reinforced by gussets 164, and the channel-shaped structure 172 is similarly reinforced. The side walls and channel-shaped structures contribute structural strength to the bottom diaphragm 100 for supporting the weight of a seated passenger while minimizing the weight of the diaphragm.

As shown in FIG. 9, the sleeve 130 preferably has a supporting portion 132 and a larger, stirrup receiving portion 134. Similarly, the sleeve 150 has a supporting portion 152 and a larger, stirrup receiving portion 154. The stirrup receiving portions 134 and 154 of the sleeves can accommodate the upwardly extending side wall portions of leg stirrups 65 and the bolts or connectors so that the sleeves 130 and 150 do not interfere with the stirrup connections.

The diaphragm 100 is preferably symmetrical about a central plane defined by bottom wall rib 114 such that the front wall 120 can be positioned adjacent either the front stretcher tube 20 or rear stretcher tube 22, depending on the location of any stirrups 65. For the purposes of description herein, the sleeve 130 formed on the front wall 120 of the diaphragm 100 is assumed be positioned adjacent the front stretcher tube 20, and the sleeve 150 formed on the rear wall 140 of the diaphragm is assumed to be positioned adjacent the rear stretcher tube 22.

The supporting portion 132 of sleeve 130 formed on the front wall 120 can be formed to extend around more than one-half the circumference of the front stretcher tube 20. In like manner, the supporting portion 152 of sleeve 150 formed on the back wall 140 can be formed to extend around more than one-half the circumference of the rear stretcher tube 22. The sleeves 130 and 150 have generally curved inner surfaces 136 and 156, respectively, for resting on the upper quadrant of a stretcher tube. Thereby, the stretcher tubes 20 and 22 provide support to the bottom diaphragm 100. However, it is to be understood that the sleeves 130 and 150 need not extend around one-half the circumference of stretcher members, but can merely provide a surface for resting on the stretcher members.

The lobes 180 are formed, for example, as shown adjacent the walls 120 and 140 and within about an inch of either end of the supporting portions. The lobes are preferably about one-half to three-quarters of an inch wide and protrude generally toward the inner surfaces of the sleeves.

The bottom diaphragm 100 is adapted to be installed by "snapping" or "popping" the lobes 180 between the stretcher tubes 20 and 22. The plastic material deforms during installation as it is pushed between the stretcher tubes, but returns back to the original relaxed condition to "lock" onto the stretcher tube by encircling more than one-half the circumference of the tubular member.

As best illustrated in FIG. 9, the lobes 180 assist in retaining the stretcher tubes on the sleeves 130 and 150. The lobes 180 on sleeves 130 and 150 are positioned on opposite ends of the diaphragm to be positioned in the gap between stretcher tubes 20 and 22. The dimensions of the diaphragm 100 and lobes 180 are designed such that the distance between the lobes on the front sleeve 130 and the back sleeve 150 is slightly larger than the distance between the stretcher tubes. To position the diaphragm on the stretcher tubes, the lobes 180 are "snapped" between the stretcher tubes. The resilient material of the diaphragm allows the lobes 180 to be slightly displaced as they are pushed over-center between the stretcher tubes to allow the passage of the lobes therebetween. Once the lobes 180 pass through the gap between the stretcher tubes, the resilient material of the diaphragm relaxes back to its original position, retaining the diaphragm on the stretcher tubes. The diaphragm 100 can be removed simply by lifting up on the diaphragm with a sufficient force to overcome the locking forces provided by the contacting lobes 180.

The diaphragm 100 preferably has strips of fabric tape, such as Velcro, adhesively attached to the upper exposed surfaces of the diaphragm, such as on sleeves 130 and 150. The tape releasable adheres to the bottom of cushion assembly 70 to assist in maintaining the cushion assembly in position on the diaphragm.

The stirrup receiving portions 134 and 154 provide sufficient clearance to receive a stretcher tube 20 or 22, a leg stirrup 65, and the bolts or connectors used to connect the stretcher tubes to the leg stirrups.

It is to be understood, however, that even through numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

Having described the invention, what is claimed is:

1. A passenger seat comprising: a base frame having a pair of spaced stretcher members and a pair of spreaders; a seat cushion having an energy absorbing portion formed of buoyant material and a comfort portion, said energy absorbing portion being positioned adjacent said comfort portion; a bottom diaphragm extending between said stretcher members, said bottom diaphragm having an open receptacle for receiving said energy absorbing portion of said seat cushion and for positioning said energy absorbing portion below the spinal column of a passenger seated on said comfort portion; and rim means on said bottom diaphragm for engaging said spaced stretcher members and for supporting said comfort portion of said seat cushion.

2. A passenger seat according to claim 1, said seat cushion comfort portion being made of soft, open-cell, foam material and said energy absorbing portion being made of closed-cell foam.

3. A passenger seat according to claim 1, said bottom diaphragm having a unitary body integrally formed of plastic, said unitary body having spaced connectors for securing said bottom diaphragm between said stretcher members.

4. A passenger seat including a base frame having front and rear stretcher members and a pair of spreaders; a seat cushion having a floatation portion formed of buoyant material and a comfort portion; and a bottom diaphragm extending between said front and rear stretcher members, said bottom diaphragm comprising: a generally rectangular shaped bottom wall of a size to extend substantially between the front and rear stretcher members such that a first end is positioned adjacent the front stretcher member and a second end is positioned adjacent the rear stretcher member, said first end of said bottom wall having a first surface form thereon extending substantially the length of said first end, said first surface for resting on and being supported by the front stretcher member, and said second end of said bottom wall having a second surface formed thereon extending substantially the length of said second end, said second end for resting on and being supported by the rear stretcher member; each of said first and second surfaces having at least one generally channel-shaped snapping portion formed thereon, said snapping-portions being formed of plastic material and adapted to extend to over at least a wide portion of the stretcher members such that the plastic material of the snapping portion is deformed during installation as it is pushed over the wide portion of the stretcher member but returns back to a relaxed condition to lock onto the members by fitting over the wide portion of the stretcher member, said bottom diaphragm having an open receptacle for receiving said floatation portion of said seat cushion.

5. A passenger seat according to claim 4, wherein the stretcher members of the base frame are stretcher tubes and said generally channel-shaped snapping portions have an open, generally semi-cylindrical structure adapted to extend around more than one-half of the circumference of the stretcher tubes.

6. A passenger seat according to claim 4, wherein said bottom wall has upwardly extending side walls formed thereon for defining said open receptacle and maintaining said flotation portion of said seat cushion therebetween and for reinforcing said bottom wall.

7. A passenger seat according to claim 6, wherein said side walls have channel-shaped structures formed thereon to further reinforce said bottom wall.

8. A passenger seat according to claim 6, said bottom wall having a web portion with reinforcing ribs formed thereon to enable a reduction in thickness of the web portion, whereby the weight of the diaphragm is reduced.

9. A passenger seat according to claim 4, wherein said snapping portions have at least one lobe formed thereon for assisting in retaining the stretcher members within the snapping portions.

10. A passenger seat comprising: a base frame having a pair of stretcher members and a pair of spreaders; a seat cushion having a floatation portion formed of buoyant material and a comfort portion; and a bottom diaphragm extending between said stretcher members, said bottom diaphragm having an open receptacle for receiving said floatation portion of said seat cushion snapping portions configured such that an uplift force of at least 135 pounds is required to disengage said snapping portions from said stretcher members.

11. A passenger seat comprising: a base frame having a pair of stretcher members and a pair of spreaders; a seat cushion having a floatation portion formed of buoyant material and a comfort portion; a bottom diaphragm extending between said stretcher members, said bottom diaphragm having an open receptacle for receiving said floatation portion of said seat cushion; a locator pin projecting from said bottom diaphragm; and at least one of said stretcher members having an opening formed therein to receive said locator pin.

12. A bottom diaphragm for supporting a seat cushion between front and rear stretcher members held in position by spreader members and supported by leg assemblies, said bottom diaphragm comprising: a diaphragm body portion for spanning space between the front and rear stretcher members; and front and rear gripper portions on said diaphragm body portion for detachably securing said diaphragm body portion to the stretcher members, said gripper portions being configured to accommodate at least one of the leg assemblies positioned between the spreader members.

13. A bottom diaphragm according to claim 12, said diaphragm body portion comprising: a bottom wall; front and mar walls projecting from said bottom wall; side walls extending from said bottom wail and one of said side walls extending between each end of said front and rear walls, said front, rear and side walls forming a chamber in said diaphragm body portion.

14. A bottom diaphragm according to claim 13, said diaphragm body portion having flanges projecting from said front and rear walls, said front and rear gripper portions being formed on said flanges.

15. A bottom diaphragm according to claim 14, said flanges having inner edges secured to said front and rear walls and curved portions spaced outwardly from said inner edges, said curved portions being configured to at least partially encircle a tubular member supporting the bottom diaphragm.

16. A bottom diaphragm for the base frame of a passenger seat, the seat having a plurality of leg assemblies for supporting a front stretcher member and a rear stretcher member in spaced-apart relationship, the diaphragm comprising: an integrally formed body of plastic material, said body having a generally rectangular bottom wall having a first sleeve formed on a first end of said bottom wall and a second sleeve formed on an opposite end of said bottom wall, said first and second sleeves being generally channel shaped and having a surface extending substantially the length of the first and second ends of said bottom wall for resting on the stretcher members and distributing the weight of a person in the seat, said sleeves having a snapping portion that is adapted to extend around a wide portion of the stretcher members such that the plastic material of the sleeves is deformed during installation as it is pushed over the wide portion of the stretcher member but returns back to a relaxed condition to lock onto the members by fitting over the wide portion of the stretcher member.

17. A bottom diaphragm according to claim 16, wherein said snapping portion of said sleeves has at least one lobe formed thereon for engaging a stretcher member.

18. A bottom diaphragm according to claim 16, wherein said sleeves have tape adhesively bound to an upper surface of the sleeves, whereby a cushion assembly can be releasable retained in position by said tape.

19. A bottom diaphragm for supporting a seat cushion on an aircraft seat between front and rear stretcher members held in position by spreader members and supported by leg assemblies, said bottom diaphragm comprising; generally rectangular bottom wall with opposite first and second ends, each of the first and second ends having a horizontally extending, generally channel-shaped sleeve formed thereon for removably mounting the bottom diaphragm to the from and rear stretcher members, at least one of said sleeves having a hollow locator pin formed thereon for positioning said bottom diaphragm on at least one of the stretcher members, wherein said bottom wall, said first and second ends and said sleeves are integrally formed for supporting the seat cushion on said bottom wall.

20. A bottom diaphragm for supporting a seat cushion between front and rear stretcher members held in position by spreader members and supported by leg assemblies, said bottom diaphragm comprising: a diaphragm body portion for spanning space between the front and rear stretcher members; front and rear gripper portions on said diaphragm body portion for detachably securing said diaphragm body portion to the stretcher members, said gripper portions being configured to accommodate at least one of the leg assemblies positioned between the spreader members, said diaphragm body portion having a bottom wall; front and rear wales projecting from said bottom wall; side walls extending from said bottom wall, one of said side walls extending between each end of said front and rear walls, said front, rear and side walls forming a chamber in said diaphragm body portion; and said diaphragm body portion further having flanges projecting from said front and rear walls, said front and rear gripper portions being formed on said flanges, said flanges having inner edges secured to said front and rear walls and curved portions spaced outwardly from said inner edges, said curved portions being configured to at least partially encircle a tubular member supporting the bottom diaphragm, at least one lobe on each of said front and rear walls, each of said lobes being positioned relative to said curved portions of said flanges for gripping a tubular member positioned between said curved portions and said lobes.

21. A bottom diaphragm for supporting a seat cushion between front and rear stretcher members held in position by spreader members and supported by leg assemblies, said bottom diaphragm comprising: a diaphragm body portion for spanning space between the front and rear stretcher members, said diaphragm body portion having upper surfaces configured for supporting a seat cushion and bottom surfaces configured for supporting a life vest pouch; front and rear gripper portions on said diaphragm body portion for detachably securing said diaphragm body portion to the stretcher members, said gripper portions being configured to accommodate at least one of the leg assemblies positioned between the spreader members; and a life vest pouch secured to said diaphragm body portion.

22. A passenger seat comprising: a base frame having a pair of stretcher members and a pair of spreaders; a seat cushion having an energy absorbing portion formed of buoyant material and a comfort portion; a bottom diaphragm extending between said stretcher members, said bottom diaphragm having an open receptacle for receiving said energy absorbing portion of said seat cushion and for positioning said energy absorbing portion below the spinal column of a passenger seated on said comfort portion, said open receptacle having a bottom wall; and bosses for mounting a life vest pouch on an outside bottom surface of said bottom wall, said bosses being configured for receiving fasteners for attaching said life vest pouch to said bottom wall.

* * * * *

UNITED STATES PATENT AND TRADEMARK OFFICE
CERTIFICATE OF CORRECTION

PATENT NO. : 5,485,976

DATED : January 23, 1996

INVENTOR(S) : Kevin S. Creed & Clay Gilbert

It is certified that error appears in the above-indentified patent and that said Letters Patent is hereby corrected as shown below:

Column 4, line 18, change "259" to read --25,--.

Column 5, line 61, change "machine" to read --machined--.

Column 7, line 5, change "7!)" to read --70--.

Column 8, line 33, change "96e" to read --96c--.

Column 9, line 3, change "hold" to read --hole--.

Column 11, line 17, change "through" to read --though--.

Column 11, line 59, change "form" to read --formed--.

Column 12, line 38, between "cushion" and "snapping" insert --and--.

Column 12, line 64, change "mar" to read --rear--.

Column 12, line 65, change "wail" to read --wall--.

Column 13, line 41, change "comprising;" to read --comprising: a--.

UNITED STATES PATENT AND TRADEMARK OFFICE
CERTIFICATE OF CORRECTION

PATENT NO. : 5,485,976

DATED : January 23, 1996

INVENTOR(S) : Kevin S. Creed & Clay Gilbert

It is certified that error appears in the above-indentified patent and that said Letters Patent is hereby corrected as shown below:

Column 14, line 9, change "wales" to read --walls--.

Signed and Sealed this

Twenty-third Day of April, 1996

*Attest:*

BRUCE LEHMAN

*Attesting Officer*    *Commissioner of Patents and Trademarks*